United States Patent
Haight et al.

(10) Patent No.: US 6,704,542 B2
(45) Date of Patent: Mar. 9, 2004

(54) HUB AND PROBE SYSTEM AND METHOD

(75) Inventors: Robert W. Haight, San Mateo, CA (US); James Milton Marshall, Sunnyvale, CA (US)

(73) Assignee: Cocomo MB Communications, Inc., Tokyo (JP)

( * ) Notice: Subject to any disclaimer, the term of this patent is extended or adjusted under 35 U.S.C. 154(b) by 356 days.

(21) Appl. No.: 09/909,247

(22) Filed: Jul. 19, 2001

(65) Prior Publication Data

US 2001/0041531 A1 Nov. 15, 2001

Related U.S. Application Data

(63) Continuation-in-part of application No. 09/340,218, filed on Jun. 25, 1999.

(51) Int. Cl.[7] .............................. H04H 1/00; H04H 7/00
(52) U.S. Cl. .................... 455/3.01; 455/3.05; 455/3.06
(58) Field of Search ............................. 455/3.01, 3.05, 455/3.06, 41.2, 41.1, 41.3, 39, 523; 343/904; 342/22

(56) References Cited

U.S. PATENT DOCUMENTS

| | | | | |
|---|---|---|---|---|
| 3,400,221 A | * | 9/1968 | Wolters | 455/3.06 |
| 4,743,916 A | * | 5/1988 | Bengeult | 343/785 |
| 5,416,452 A | * | 5/1995 | Noerpel et al. | 333/113 |
| 5,994,984 A | * | 11/1999 | Stancil et al. | 333/248 |
| 6,336,031 B1 | * | 1/2002 | Schyndel | 455/41.2 |
| 6,512,431 B2 | * | 1/2003 | Pergande | 333/246 |

OTHER PUBLICATIONS

Macleod, H.A. and Clark, C., Evanescent Waves and Some of Their Applications, Apr. 2001, Society of Vacuum Coaters, 44th Annual Technical Conference Proceedings, pp. 328–333.*

* cited by examiner

*Primary Examiner*—Charles Appiah
*Assistant Examiner*—Lewis G. West
(74) *Attorney, Agent, or Firm*—Michael J. Hughes; IPLO Intellectual Property Law Offices

(57) ABSTRACT

A method is afforded for utilizing and implementing a hub and probe system in a wireless communication structure. A hub communicates a first signal. The signal is communicated via evanescent waves created by an exciter. A probe receives the signal from the exciter via the evanescent waves. Conductive elements included in walls of the wireless communications structure receive a second signal from the probe. The conductive elements communicate the second signal to the exciter. The exciter passes the second signal back to the exciter.

22 Claims, 9 Drawing Sheets

HUB AND PROBE SYSTEM AND METHOD

CROSS-REFERENCE TO A RELATED PATENT APPLICATION

The present application is a Continuation-In-Part Patent Application, and the Inventor claims the benefit of priority for all subject matter commonly disclosed in the present patent application and in parent patent application Electromagnetic Communication System for Wireless Networks, filed on Jun. 25, 1999 and assigned U.S. Ser. No. 09/340,218. This application is related to United States Patent Applications entitled Exciter System and Method for Communications Within an Enclosed Space being filed concurrently with the present application and which is incorporated by reference in its entirety for all purposes.

TECHNICAL FIELD

The present invention relates generally to wireless communications, and more particularly to a hub and probe system and method for internal communications within structures, particularly at frequencies in the range of 0.5 to 100 MHz.

BACKGROUND ART

Communications within buildings and other enclosed spaces have long presented problems. Communication wiring, such as for local area networks, is effective but suffers from problems with installation costs, limitations on connection locations and the need for periodic upgrading when technology advances. Metallic structural members, interior furniture, plumbing and electrical wiring all have a tendency to interfere with conventional wireless communications. Outside interference, such as from galactic noise and human generated electromagnetic sources also frequently interferes with the quality and efficiency on in-building communications.

As described in the inventors prior application, a neglected frequency band in the electromagnetic spectrum, at least from the standpoint of communication utilization, is that in the 0.5–100 MHz range. Much of this range is traditionally considered to be less than useful, and is accordingly less regulated by government entities. An example of this in the United States is that Part 15 of the FCC Rules apply in this range. One reason that this range is not widely utilized is that the waveforms have sufficiently long wavelengths that structural interference affects transmission and reception. However, with the inventor's technology it has become possible to harness this range of frequencies and to turn the factors which have been hindrances into advantages.

An area of electromagnetic phenomena which has been little understood and utilized traditionally is that dealing with evanescent (non-propagating) waves. Commercial utilization of these phenomena have been rare. The phenomena are known and observed in waveguide technology, but are ordinarily a hindrance, and limit the utility of structure near what is known as "cut-off".

Cut-off occurs for conventional propagation in hollow pipe waveguides when the size of the hollow pipe waveguide is less than one-half (½) of the wavelength at the operating frequency. When these conditions obtain, the transmission losses are very high but not infinite. The expression for attenuation below cut-off in ideal waveguides, Equation 1, may be written:

$$\gamma = 2\pi/\lambda_c \sqrt{1-(f/f_c)^2} \quad (1)$$

where:
$\gamma$=attenuation
$\lambda_c$=cut-off wavelength
f=operating frequency
$f_c$=operating frequency at cut-off
where the wavelength, f is approximately equal to 11.8/f (GHz) in inches.

As f is decreased below $f_c$, $\gamma$ increases from a value of 0 approaching the constant value of $2\pi/\lambda_c$, when $(f/f_c)^2 \ll 1$.

The amount of attenuation is determined only by the cut-off wavelength of the waveguide, which is in general proportional to the transverse size of the waveguide, so that the value of $\gamma$ may be made almost as large as one pleases by selecting a low cut-off wavelength or a high cut-off frequency (small pipe size). Since (1) holds for any wave in any shape of guide, it follows that choices of wave type and guide shape cannot influence the attenuation constant except in so far as they fix the cut-off wavelength $\lambda_c$.[1]

Wave motion, forming the core of many subjects in physics, is a prominent (interdisciplinary) topic in many textbooks.[2] While traditional wave motion is often dealt with in great detail (for good reasons), the theory of evanescent waves is often only mentioned in passing.

Such small mention is by no means justified: evanescent waves—originally indeed introduced as convenient mathematical tools having no application in mind[3][4]—matured in the last decades to a topic of its own intrinsic interest finding a steadily increasing number of applications in basic as well as applied research and in industry.

[1] "Fields and Waves in Modem Radio", Simon Ramo and John Whinnery, pg 386–387, dated May 1956
[2] ON EVANESCENT WAVES, A. Stahlhofen and H. Druxes, Univ. Koblenz, Inst. f. Physik, Rheinau 1, D-56075 Koblenz, Germany
[3] Bryndahl, O., "Evanescent waves in optical imaging", in *Progress in Optics* (American Elsevier Publishing Co, New York 1973), pp 169–221
[4] Hupert, J. J., *Appl. Phys.* 6, 131–149 (1975)

Any propagating wave is converted into an evanescent wave when hitting a classically forbidden region (below cut-off). In this case, at least one component of the wave vector becomes imaginary or a complex value and the wave experiences exponential damping when operating in this region (the cut-off effect described above). Such waves are used as diagnostic tools in many contexts involving waveguides; applications range from diverse areas of solid state physics and microwave-technologies. Explicit examples show that evanescent waves play an important role in microwaves, optics, and quantum mechanics. Despite the fact that all of these systems are governed by different wave-equations, different dispersion laws, different energy regimes and completely different structures and sizes, wave motion in the respective systems under consideration often involves evanescent waves.

The typical mechanisms accounting for the existence of evanescent waves are: 1) conversion into other forms of energy in lossy media, 2) cut-off modes in certain directions resulting from reflections in lossless media, 3) gradual leakage of energy from certain guiding structures and 4) mode conversion produced by obstacles or by changes in guiding structures.

Evanescent waves have some peculiar properties sometimes defying intuition. As a typical example the fact was mentioned that they operate in the forbidden region (below cut-off) experiencing exponential damping. Wave motion involving evanescent waves is easily demonstrated with electromagnetic waves using microwaves. A guide to many experiments involving evanescent waves is provided by PIRA, the "Physics Instruction Resource Association" located at http://www.physics.umd.edu/deptinfo/facilities/ lecdem. This source provides short descriptions of hands-on as well as more sophisticated experiments with evanescent waves referring for details to easily accessible literature.

It is now established that electromagnetic connectivity can be achieved by the use of evanescent non-propagating waves below cut-off or propagating waves above frequency cut-off. Some methodology must be developed which can inject currents into the metallic elements of a structure in order that evanescent waves be generated in the cut-off region. For frequencies above the cut-off region more traditional antenna technologies can be used.

Although the phenomena relating to evanescent waves and other wave characteristics resulting at wavelengths below or near cut-off regions are known, they have not heretofore been meaningfully commercially utilized. In general, these phenomena are considered to be hindrances and nuisances, rather than opportunities for actually enhancing communications. In this light, there remain many opportunities for utilization and improvement, to be addressed by the present invention and the Inventor's related inventions.

SUMMARY OF THE INVENTION

Accordingly, it is an object of the present invention to utilize the characteristics of electromagnetic energy in frequencies which produce evanescent waves, and in near cutoff frequencies, to provide a medium for effective communication within structures.

It is another object of the present invention to provide a medium for an exciter to send and receive information wirelessly within a structure.

It is a further object of the present invention to provide a probe on remote devices for receiving information through the medium and sending information thereto.

It is yet another object of the present invention to provide for a remote device probe that creates a radio frequency to transmit data to the exciter and ultimately to the medium for communicating with devices outside the structure, as well as with other remote devices in the structure.

Another object of the present invention is to provide a probe that creates an electromagnetic environment for coupling the transmission of signals to the conducting elements of the building and thereby the exciter.

Briefly, a preferred embodiment of the present invention is an exciter system for energizing and operating with the *Electromagnetic Field Communications System for Wireless Networks*. This is a wireless technology scheme which allows wireless communication within a structure. In a typical residential, commercial or industrial building, the exciter performs the function of exciting the a conductive framework, formed of metallic elements existing within the walls of the structure, whether they be electrical wires, metal walls, plumbing or any combination thereof This wireless system is initiated by a hub and controller network which is connected to and drives the exciter. The exciter in turn energizes the conductive framework in the building walls for use by any number of remote wireless receivers situated within the structure. The basis for this technology is disclosed and contained in the inventor's U.S. Patent Application entitled *Electromagnetic Field Communications System for Wireless Networks*, Ser. No. 09/340,218, filed Jun. 25, 1999. The hub and controller network along with the exciter works to allow a complete wireless system to operate within a structure that would otherwise not be possible.

The Hub receives information from devices outside of a wireless communication structure. These external devices may be hard wired to the Hub or they may connect wirelessly. The Hub may also receive information from remote devices in the structure. The Hub transmits this data to the exciter by sending a frequency signal thereto. The exciter creates evanescent waves and relays the radio frequency to a probe on a remote device within the wireless communication structure via the evanescent waves. The probe passes the information to applications electronics, such as telephones, PCs, etc. Outgoing communications from the remote device are sent to the exciter via the probe when the probe electromagnetically couples radio frequency signals to the conductive elements in the walls of the structure. The exciter receives the radio frequency signal and passes the signal to the Hub, where it may be communicated externally or internally to other remote devices.

An advantage of the present invention is that it provides a way to activate an effective communications bubble within a building or structure which minimizes interference from outside sources, such as galactic noise and man made radio frequency signals.

Another advantage of the present invention is that the Hub controls the dissemination of incoming and outgoing communications as related to external devices.

Yet another advantage of the present invention is that it minimizes noise interference from sources within the building.

A further advantage of the present system is that it can operate under Part 15 of the FCC rules.

Yet another advantage of the invention is that it uses the size of a structure to eliminate the need for very large antennas.

Another advantage of the present invention is that the remote device probe is compact and is not direction sensitive.

It is another advantage of the present invention that a broad frequency range is created by the exciter, hub, and probe as a system.

A further advantage of the present invention is the flexibility within the broad frequency range, created by the linear and bilateral nature of the system, to utilize all means of modulation techniques including Frequency Division Multiple Access (FDMA), Time Division Multiple Access (TDMA), and Code Division Multiple Access (CDMA).

These and other objects and advantages of the present invention will become clear to those skilled in the art in view of the description of the best presently known mode of carrying out the invention and the industrial applicability of the preferred embodiment as described herein and as illustrated in the several figures of the drawings.

BEST MODE FOR CARRYING OUT THE INVENTION

Figure 1:
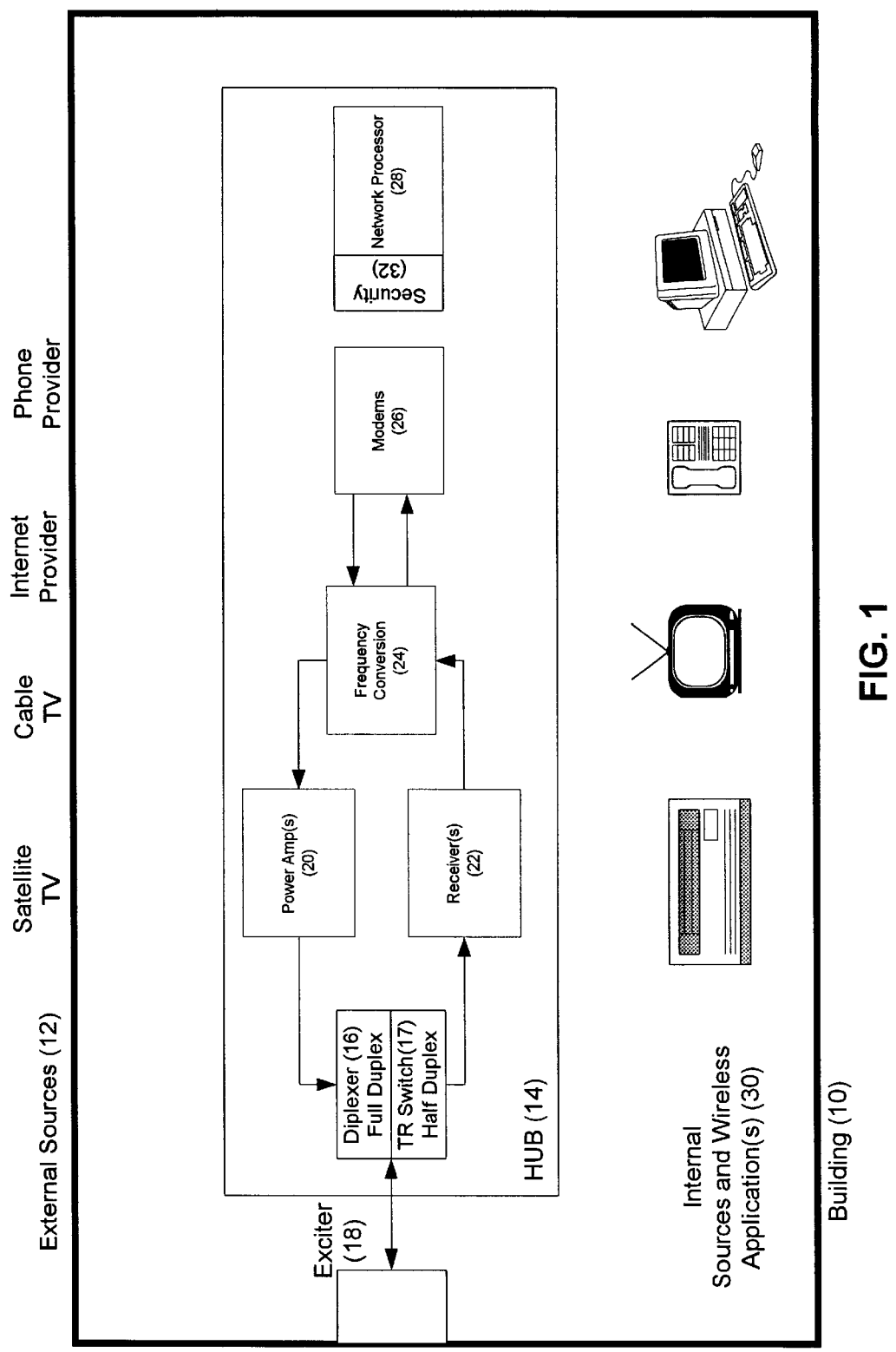
FIG. 1 is a schematic illustration of the various parts included in a wireless communications system within a structure in accordance with the present invention.

The present invention is adapted to produce the conditions under which the invention described in the prior application of George G. Chadwick, Ser. No. 09/09/340218 will operate efficiently. It is adapted to operate in an enclosed space and to operate in conjunction with the exciter system and method set forth in the companion application, filed concurrently herewith. The disclosure, text and drawings of the earlier filed priority application, published as PCT/US00/11886, are specifically incorporated herein by reference.

A presently preferred embodiment of the invention is hub and probe system and a method of using the hub and probe system in an overall system to facilitate and optimize wireless communication within any of a variety of enclosed spaces. The preferred embodiment of the present invention is adapted to facilitate and work within the Electromagnetic Field Communication System for Wireless Networks set forth in the above referenced prior application. The presently preferred embodiment is referred to as a hub and probe system and method.

A hub manages information and communications signals and data between external and internal devices, as well as between internal devices. Signals may be communicated from the hub to an exciter that creates evanescent waves throughout a structure. These evanescent waves transmit the information wirelessly to remote devices in the structure. Wireless remote devices in the structure communicate with the hub by using a probe to electromagnetically couple transmitted signals into the structure's conductive elements, which are connected to the exciter. The exciter sends these signals to the hub.

The hub and probe system works with the exciter system disclosed in the companion patent being filed herewith and entitled Exciter System and Method for Communications Within an Enclosed Space. The exciter system is powered by the hub and accordingly, the hub is hardwired to the exciter device. Incoming signals or information from external sources are routed initially through the hub. The hub converts the signal or information into a radio frequency with an appropriate format in the range of 0.5–100 Mhz and transmits the signal to the exciter. The exciter creates radio frequency evanescent waves, which permeate the structure and allow for transmission of the signal or information to probes connected to a variety of remote devices in the structure. The probes transmit signals via radio frequency by electromagnetically coupling to the conductive elements in the walls of the structure. The probe signal is received by the exciter via the conductive elements, and the exciter in turn passes the signal back to the hub. The hub may communicate the signal to external sources or to other probes associated with remote devices in the structure.

The exciter creates evanescent waves in the structure and probes electromagnetically couple to the conductive elements within the structure and this combination allows for wireless transmission of information within the structure. The evanescent waves are non-propagating. The wiring and conducting elements within the walls of the structure support the evanescent wave field. The exciter couples energy from the hub into the conductive elements within the walls of the structure.

FIG. 1 is a schematic illustration of the various parts included in a wireless communications system within a structure in accordance with the present invention. The structure is represented by the box outlining the internal parts and sources, and is generally referred to as a building and is denoted by the reference numeral 10. Outside of the building 10 may exist various external sources 12. These external sources may be hardwired to the hub within the building or they may communicate wirelessly with the hub. The external sources of data may include, for example, satellite television, cable television, an Internet provider, and a telephone provider.

Within the building 10 is a hub 14. Parts that may comprise the hub 14 system include a diplexer 16, connected to the exciter 18. The hub 14 may be connected to the exciter 18 via a coaxial cable or any other method suitable for use with the present invention. A power amplifier 20 for transmitting signals may be included, as well as a receiver 22 for receiving information from internal sources 30. A frequency conversion module 24 may be included for converting signals to and from radio frequencies for sending and receiving information to devices throughout the building 10. Further included may be modems 26 and a network processor 28. The foregoing parts may generally be included in the hub. Various other parts or modules may be included in the hub, as will be indicated by other embodiments of the hub in accordance with the present invention (See FIGS. 5–8).

Also within the building are internal sources and wireless applications 30. The internal sources and wireless applications 30 receive information from external sources 12 via a radio frequency from the exciter 18, the exciter receiving the frequency signal from the hub 14 and the hub 14 communicating with the external sources 12. A security layer 32 is incorporated into the hub 14 system to ensure the secure transmission and receipt of information.

The Hub 14 receives information from devices outside (i.e. external sources 12) of a wireless communication structure (i.e. building 10). These external devices 12 may be hard wired to the Hub 14. The Hub 14 transmits this data to the exciter 18 by sending a frequency signal thereto. The exciter 18, in turn, passes the radio frequency to a probe on a remote device within the wireless communication structure 10, by creating evanescent waves over which the signal travels. The probe then passes the information to applications electronics (i.e. internal sources and wireless applications 30), such as telephones, PCs, etc. Communications outgoing from the remote devices are sent to the exciter 18 via a radio frequency created by the probe, where the radio frequency signal is electromagnetically coupled to the conductive elements in the wall of the building 10. The exciter 18 receives the radio frequency from conductive elements in the walls of the building 10 and passes the signal to the Hub 14, where it may be processed internally or communicated externally.

A diplexer 16 can function to connect two pathways to the exciter from the Hub 14, such that the transmitter and receiver can operate simultaneously (full duplex). The diplexer 16 separates the pathways and prevents the transmitter from saturating the receiver 22. Alternatively, a transmit/receive (TR) switch 17 may be utilized to achieve the same separation in a communication system where neither the transmitter or receiver operate simultaneously (half duplex). The TR switch 17 may allow the transmission and receipt of information over the same frequency.

An external source may be any source of information that originates or is otherwise generated outside of the structure. Further, the external source may be the termination point of information sent from inside the structure. External sources may include devices such as a satellite television, a cable television, an Internet provider, a phone provider, or a computing device, or any other external source suitable for use with the present invention. For example, Bob, please provide more examples.

Similarly, an internal source may be any source of information that originates or is otherwise generated inside of the structure. The internal source may be the termination point of information sent from inside the structure or outside the structure. Internal sources can generally be remote devices. The remote devices may include devices such as a DVD player, a computer, a television, and a telephone. Furthermore, the remote device may include any other device suitable for use with the present invention. For instance, any computing device may be the source of an internal signal.

Figure 2:
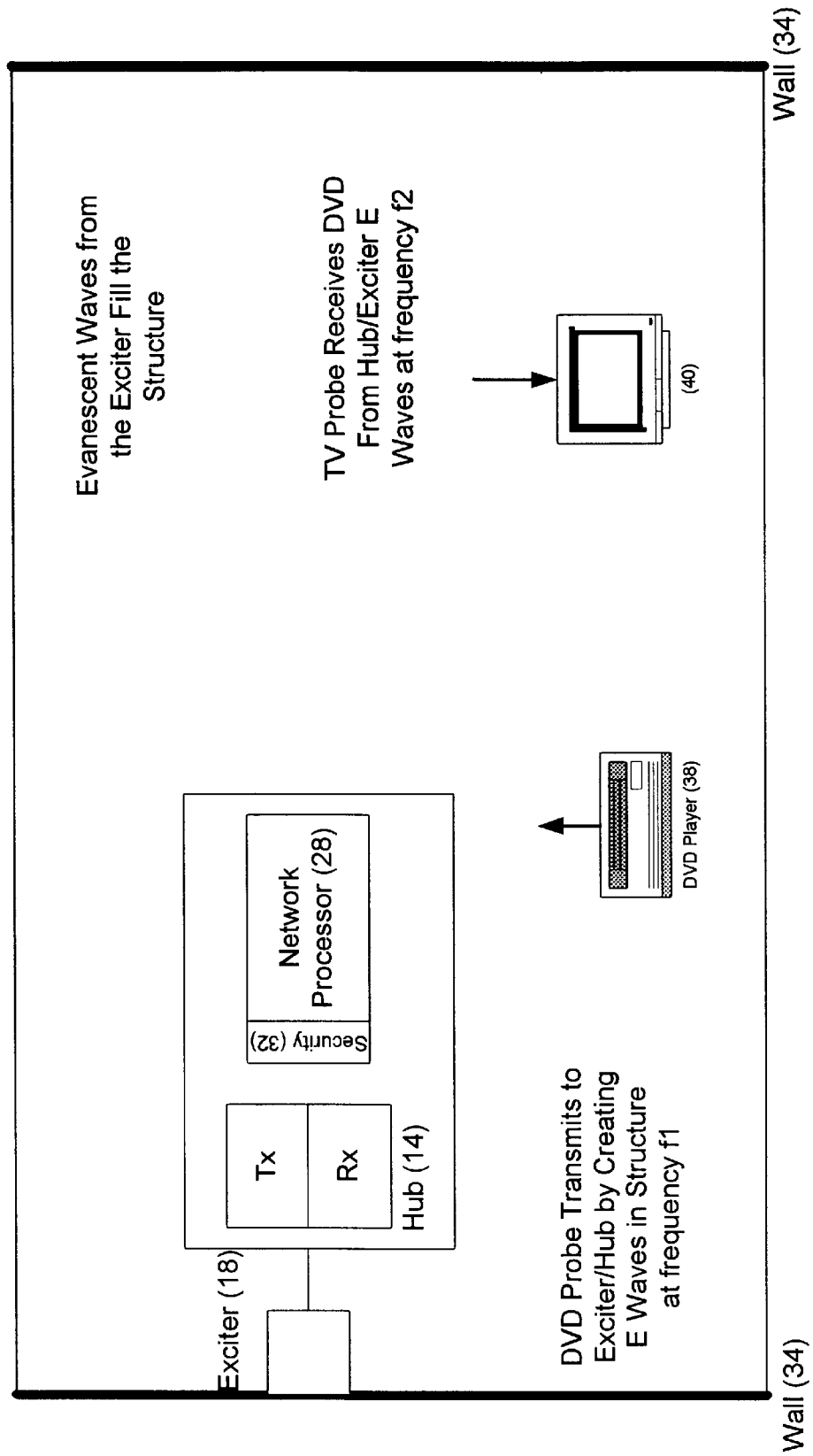
FIG. 2 is a schematic illustration of internal wireless connectivity in accordance with the present invention.

FIG. 2 is a schematic illustration of internal wireless connectivity in accordance with the present invention. The exciter 18 is connected to a wall 34 of the building 10. The network processor 28 at the hub 14 transmits (Tx) information to the exciter 18 and receives (Rx) information from the exciter 18, as shown. A probe 36 (not shown), is attached to a remote, internal device. Information sent from the exciter 18 is typically at a different frequency than information sent to the exciter 18 from the remote device. Applications employing Time Division Multiple Access (TDMA) techniques may include information sent from the exciter 18 at the same frequency as information sent to the exciter 18.

Evanescent waves from the exciter can fill the building 10. Once this environment has been created, data can be transmitted to internal devices from other internal devices in the building 10 via the hub 14. In the present example, shown in FIG. 2, a DVD player 38 in the building 10 transmits information to the hub 14. In order to accomplish this step, the DVD player 38 probe (not shown) transmits data, by electromagnetically coupling to the conductive elements, to the exciter 18 at a frequency $f_1$, and the hub 14 through the exciter connection thereto. A probe 36 on an internal television 40 receives the data from the DVD player 38 from the hub 14 via evanescent waves created by the exciter 18 and sent at a frequency $f_2$. The wall 34 of the building 10 minimizes the information exchanged internally from reaching external sources.

Figure 3:
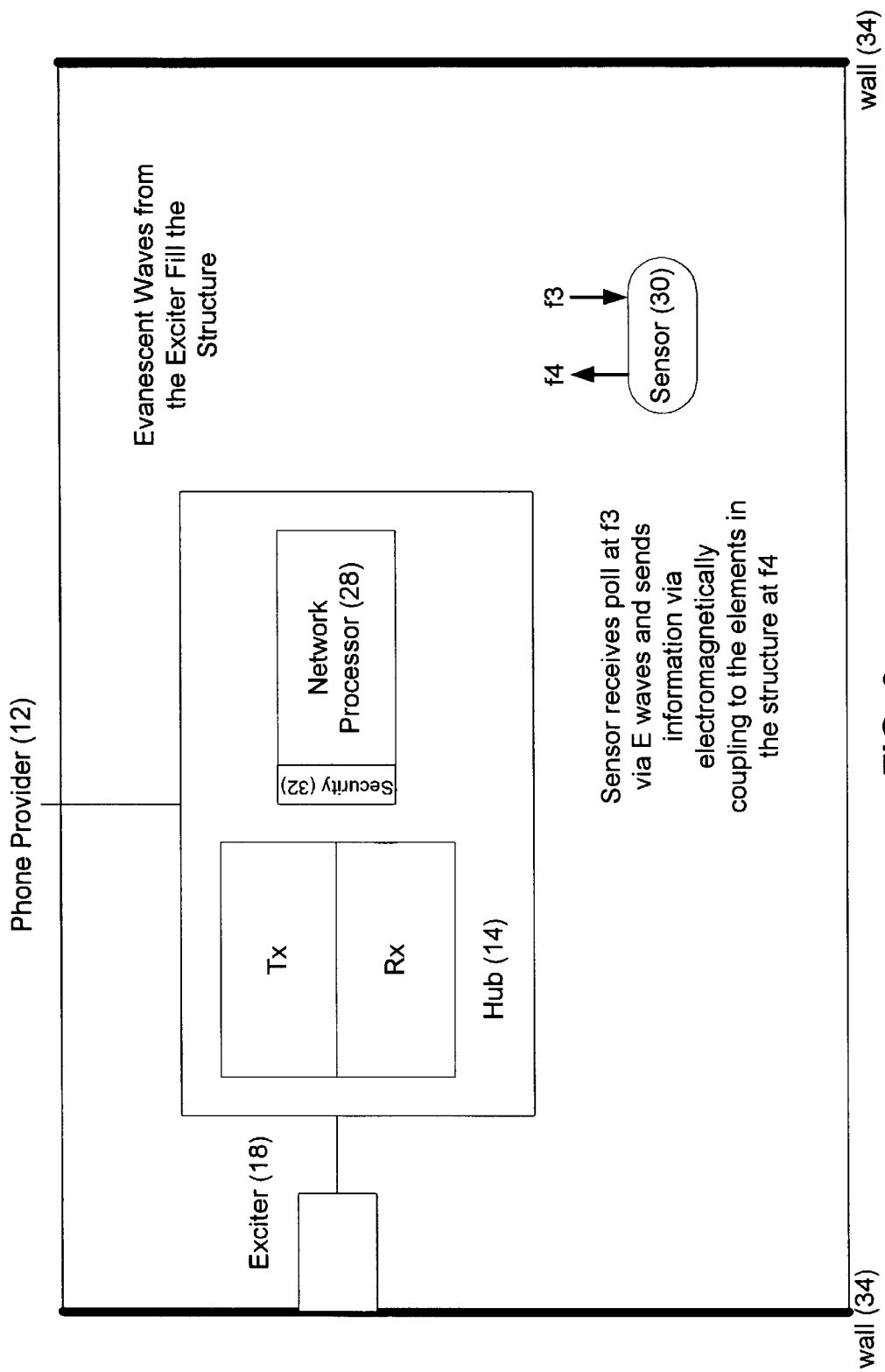
FIG. 3 is a schematic illustration of wireless applications connectivity to external sources in accordance with the present invention.

FIG. 3 is a schematic illustration of wireless applications connectivity to external sources in accordance with the present invention. An internal network polls sensors via the exciter 18 and hub 14 at frequency $f_3$. Evanescent waves from the exciter 18 fill the building 10. A sensor 36 receives this poll and sends sensor information to the exciter 18 at a frequency of $f_4$ by electromagnetically coupling to the conductive elements within the building (i.e. via walls). The exciter then passes the information to the hub 14, which may communicate with external devices. A security layer 32 exists for ensuring the secure transmission and receipt of data associated with internal devices.

Figure 4:
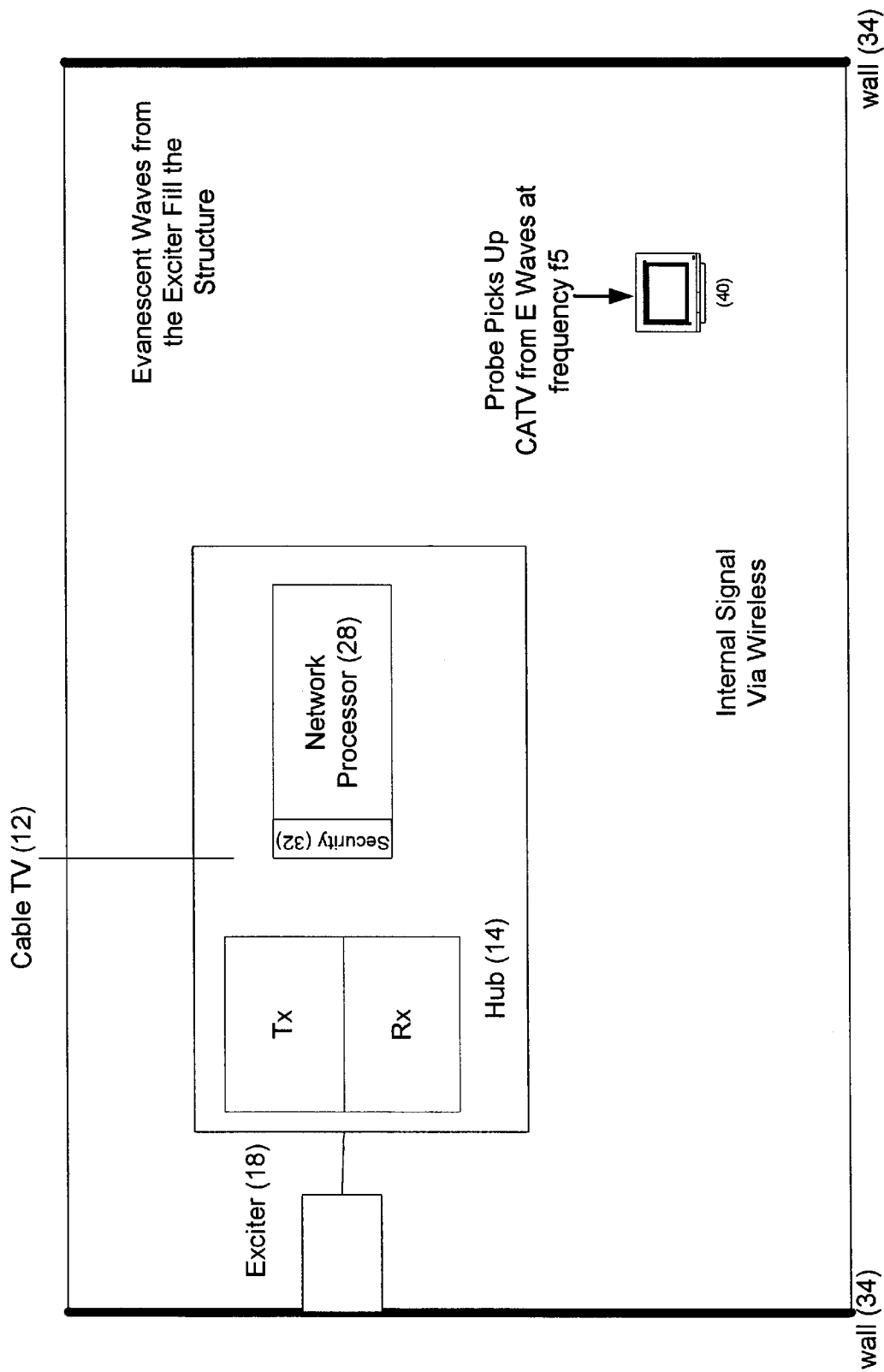
FIG. 4 is a schematic illustration of external connectivity to wireless applications in accordance with the present invention.

FIG. 4 is a schematic illustration of external connectivity to wireless applications in accordance with the present invention. A cable television signal from an external source 12 is communicated to the hub 14. The hub 14 passes the signal to the exciter 18. As before, evanescent waves from the exciter 18, at frequency $f_5$, for example, fill the building 10. A probe 36 associated with an internal remote device picks up the cable television signal from the evanescent waves. Thus, the internal cable television signal is transmitted wirelessly.

Figure 5:
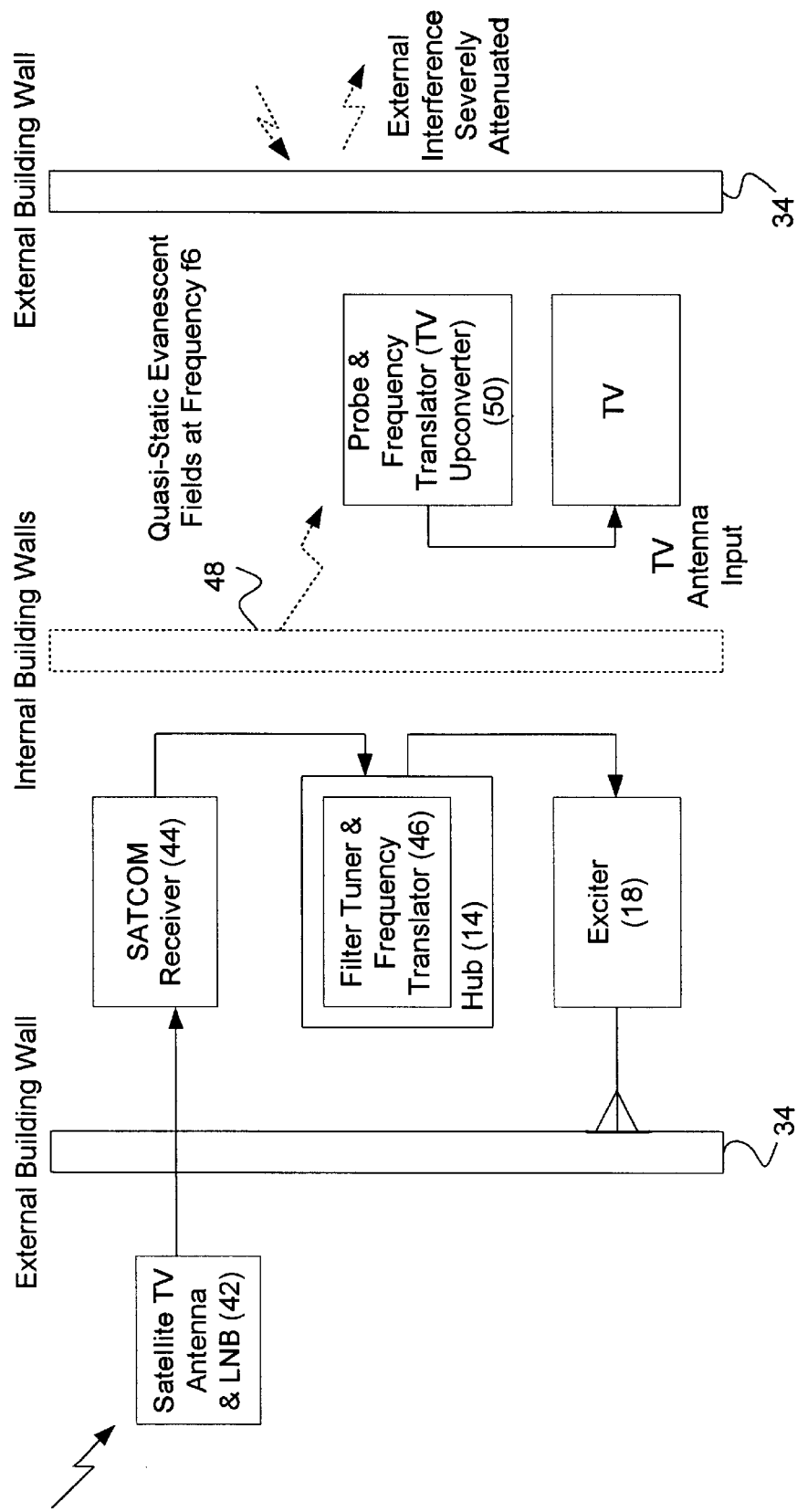
FIG. 5 is a schematic illustration of the internal environment of a wireless communication structure in accordance with the present invention.

FIG. 5 is a schematic illustration of the internal environment of a wireless communication structure in accordance with the present invention. In the present example, signals from a satellite TV antenna and LNB 42 are communicated to an internal SATCOM receiver 44 through an external wall 34 of the building 10. The SATCOM receiver 44 sends the signal to a filter tuner and frequency translator 46 at the hub 14, the signal being passed to the exciter 18. The exciter 18 creates evanescent waves at frequency $f_6$ that fill the building 10. The evanescent waves travel through the internal walls 48 of the building 10 by virtue of the wiring and conducting structures located within these walls 48. Conventional wiring within these walls 48 does not create a hindrance to the travel of the evanescent waves throughout the building 10. Further, the evanescent waves travel independent from and without interruption from the movement of people within the building 10.

A probe and frequency translator 50, otherwise known as a TV upconverter, receive the frequency signal from the exciter 18 sent from the SATCOM receiver 44 via the hub 14. A remote device within the building 10, a TV as depicted in the present diagram, receives the signal, through a probe input. As noted, external interference is severely attenuated. The internal signal is accordingly secure. Further, codes implemented at the network processor protect the security of the internal signal. Similarly, other external signal sources may be utilized, such as AM/FM radio, television, cellular and PCS signals, GPS, commercial SATCOM, weather satellite broadcasts, etc.

Figure 6:
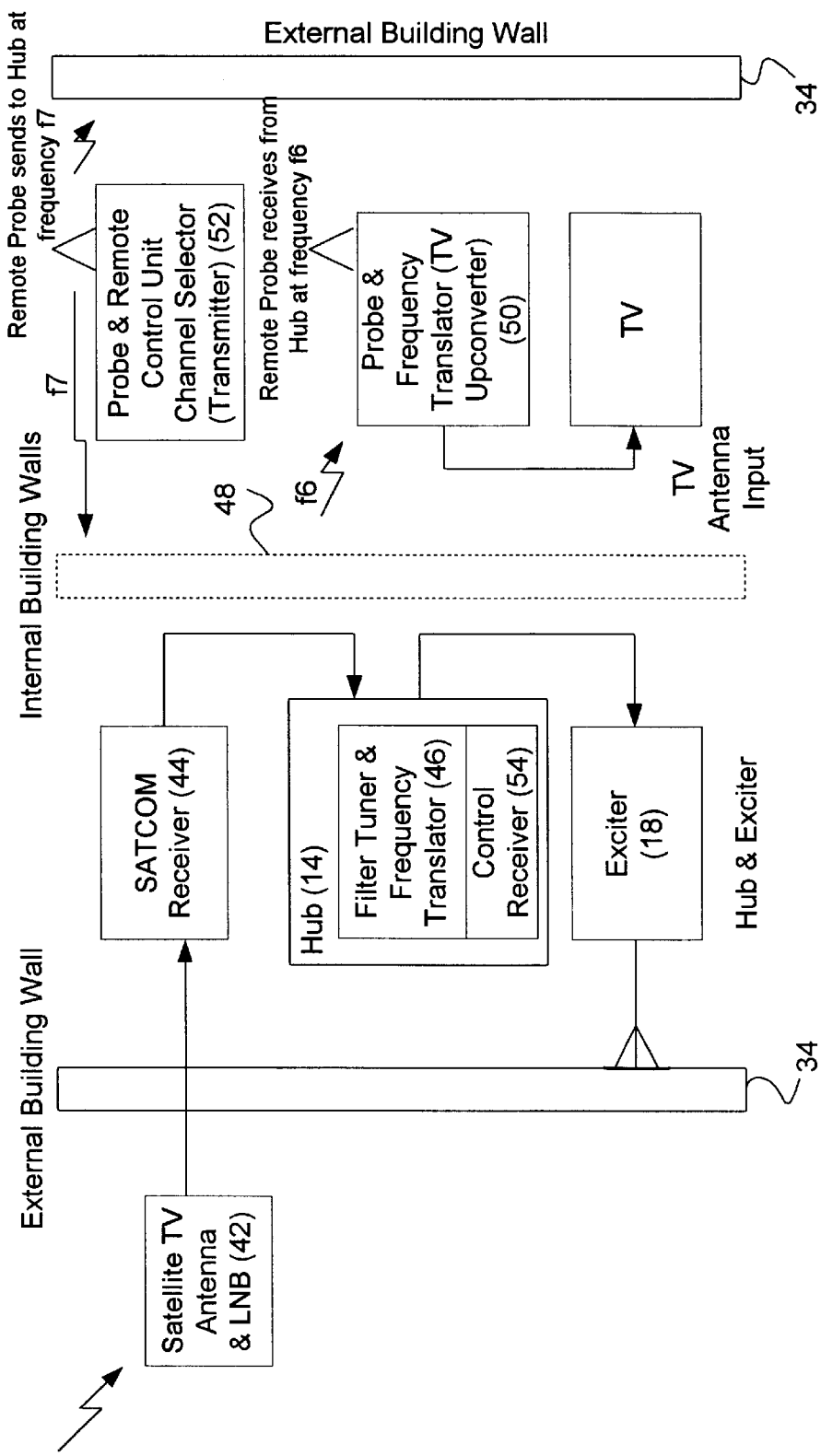
FIG. 6 is a schematic illustration of a wireless remote control system in accordance with the present invention.

FIG. 6 is a schematic illustration of a wireless remote control system in accordance with the present invention. As shown in FIG. 5, a satellite TV antenna and LNB 42 communicate a signal to an internal SATCOM receiver 44. The SATCOM receiver 44 passes the signal to the filter tuner and frequency translator 46 at the hub 14. The satellite TV signal is rebroadcast internally by communication, via the evanescent waves at frequency $f_6$ created by the exciter 18, of the signal to the probe and frequency translator 50. The probe and frequency translator 50 pass the signal to the TV antenna input in the current, as well as the previous, example.

Channel selection in the current example is accomplished via a probe and remote control unit channel selector (transmitter) 52. The probe and remote control unit channel selector (transmitter) 52 communicate at a signal at frequency $f_7$ to the exciter 18. The exciter 18 passes the signal to a control receiver 54 at the hub 14. The control receiver 54 exchanges information with the filter tuner and frequency translator 46, also at the hub 14.

Figure 7:
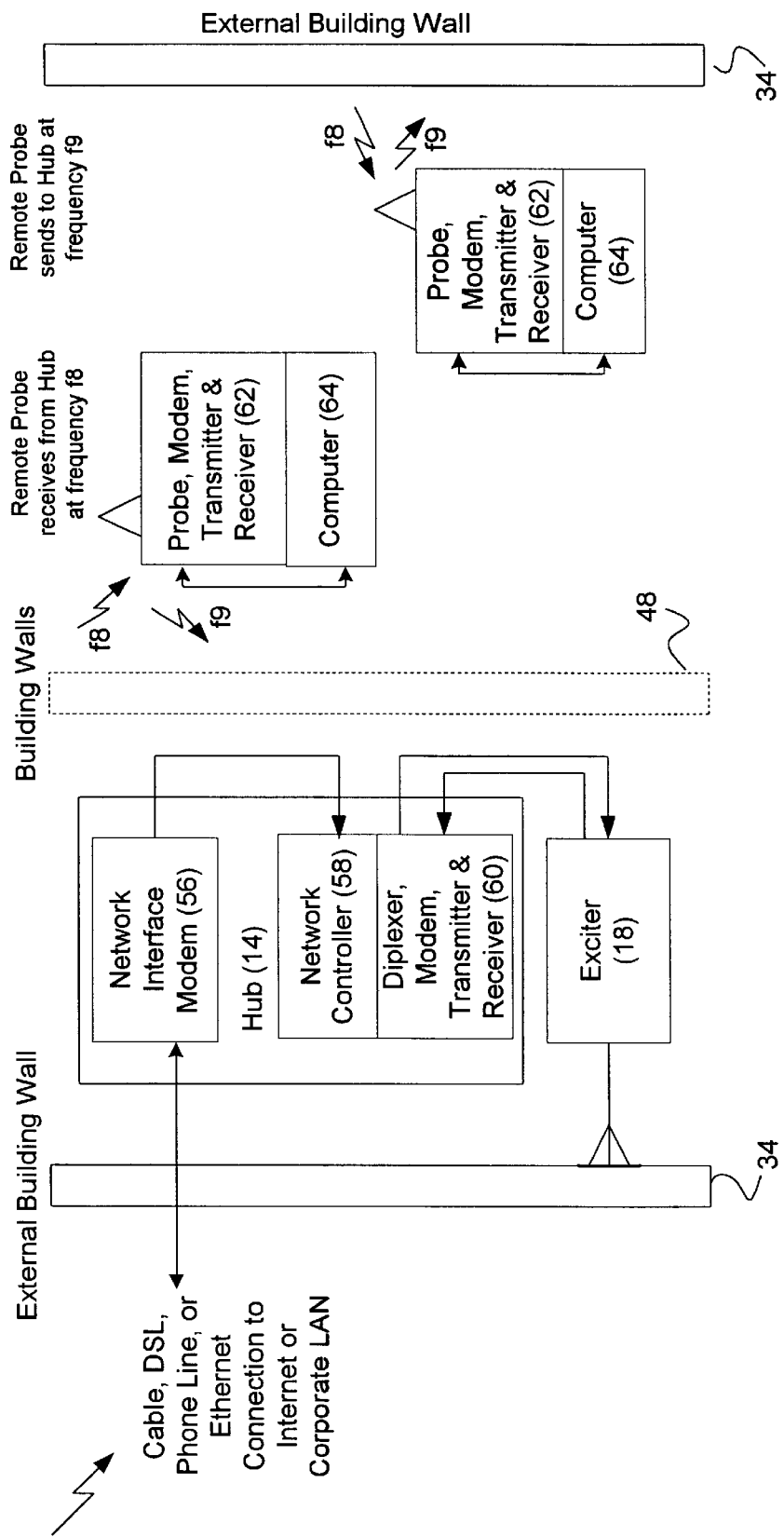
FIG. 7 is a schematic illustration of a local area network in a wireless communication structure in accordance with the present invention.

FIG. 7 is a schematic illustration of a local area network in a wireless communication structure in accordance with the present invention. An external source 12 of a connection, such as cable, DSL, or Ethernet, to the Internet or a Corporate local area network (LAN), sends a signal to an internal network interface modem 56 at the hub 14. A network controller 58, also at the hub 14, exchanges data with the network interface modem 56. A diplexer, modem, transmitter, and/or receiver 60 may be utilized to communicate signals from the hub 14 to the exciter 18. The external interface with cable, DSL, phone, Ethernet, or Corporate LAN, or other LAN connections, utilizes standard interface modems to connect to the network controller 58. The diplexer, modem, transmitter, and/or receiver 60 send signals at frequency $f_8$ to and receive signals at frequency $f_9$ from the exciter 18.

A probe, modem, and receiver 62 at a remote device, such as a computer 64, within the structure 10 receive the information at frequency $f_8$. The information is passed to the computer 64, the computer exchanging information with the probe, modem, and transmitter 62 in order to send information at frequency $f_9$ to the hub. The network processor manages the connection of the computer to external sources. Additional computers may be accessed in the structure by either time sharing $f_8$ and $f_9$ between such computers or by assigning other frequencies to such computers.

In order for the remote elements and devices (62, 64) to exchange information internally, the information is sent from one element and/or device (62, 64) via the hub 14 to another element and/or device (62, 64) located in the building 10. The hub 14 generates a control signal for collision avoidance purposes where multiple access networks are involved.

Figure 8:
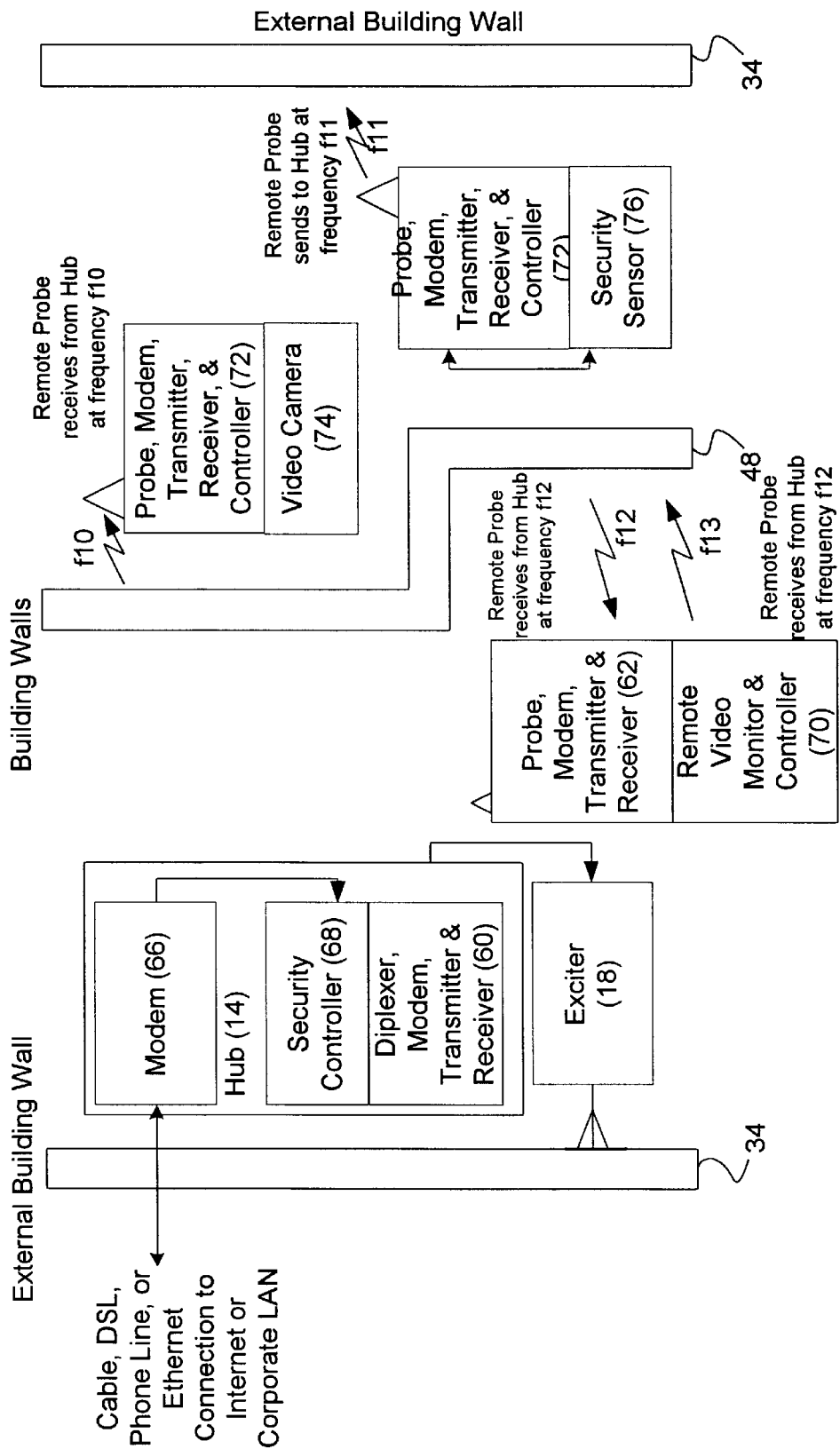
FIG. 8 is a schematic illustration of a security system in a wireless communication structure in accordance with the present invention.

FIG. 8 is a schematic illustration of a security system in a wireless communication structure. An external source 12 provides an outside connection, such as an outside cable, DSL, phone line, or Ethernet connection to the Internet or corporate LAN, to an internally located modem 66 at the hub 14. The modem 66 exchanges information with a security controller 68. A diplexer, modem, transmitter, and/or receiver at the hub 14 assist in communicating signals to devices in the building 10 through the exciter 18. The security controller requests information from sensors at frequency $f_{10}$. The sensors reply at frequency $f_{11}$. The security monitor provides security information to an external system via a modem or to an internal remote monitor 70 at frequency $f_{12}$.

Sensor and video camera data are delivered via evanescent waves at frequency $f_{12}$ created by the exciter 18 and are received by a probe, modem, and receiver 62 connected to a remote video monitor and control 70. The remote video monitor 70 communicates at frequency $f_{13}$ with both the hub 14, and the elements therein 18, 60, 68, and 66. The other modules 72 are connected to remote devices, such as a video camera 74 and a security sensor 76 in the present example, for communicating data from these remote devices 74, 76 to the security controller 68 in the building 10. The remote video monitor and control system 62, 70 also relays data to the hub 14.

Figure 9:
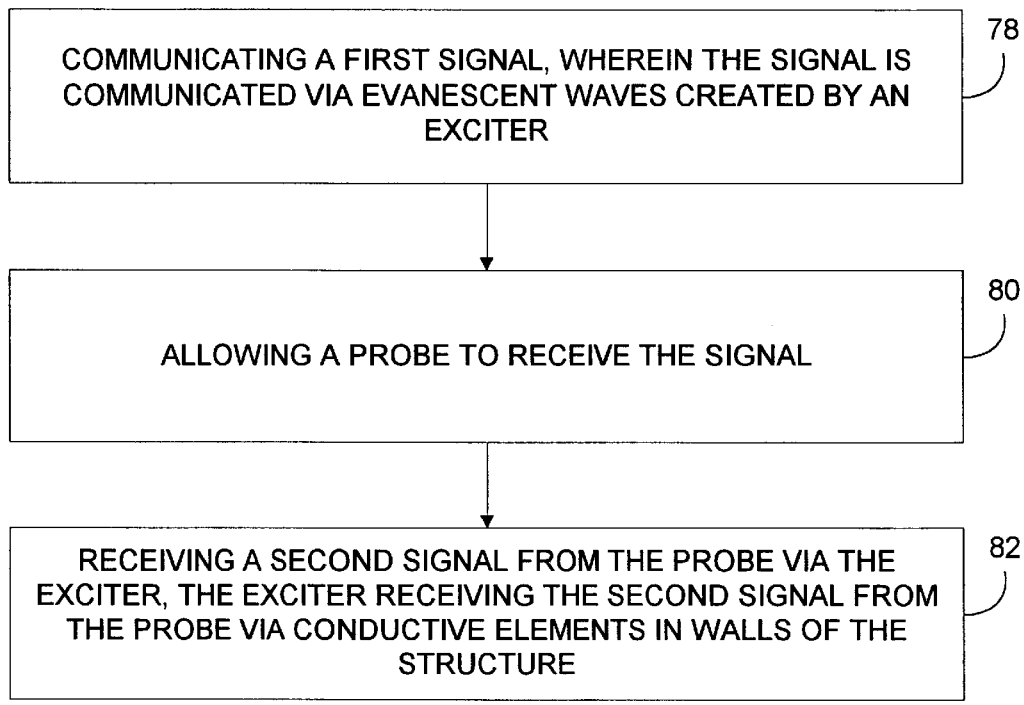
FIG. 9 is a flowchart illustrating a process for utilizing a hub and probe system in accordance with the present invention.

FIG. 9 is a flowchart illustrating a process for utilizing and hub and probe system in a wireless communications structure in accordance with the present invention. In operation 78, a first signal is communicated from the hub. This signal may be communicated to a remote device, connected to the probe, located in the structure. The signal may originate from a source external to the structure, such as a satellite television, cable television, an Internet provider, or a phone provider. The signal may originate from a second remote device (i.e. an internal signal) in the structure, such as a DVD player, or a computer that is connected to the hub. The signal is communicated (to the remote device) via evanescent waves created by an exciter. A probe is allowed to receive the signal in operation 80. In operation 82, a second signal is received at the hub from the probe via the exciter. The first signal or the second signal may be at a radio frequency between 0.5–100 MHz. The exciter receives the second signal from the probe via conductive elements in walls of the structure.

The first signal is communicated from the hub and the second signal is received by the hub. The source of the first or second signal may be external or internal. An external source includes a source that communicates information from outside the structure, while an internal source includes a source that communicates information from inside the structure, such as a remote device. Remote devices may include, for example, a DVD player, a computing device, etc. External sources of information may similarly include, for example, a DVD player, a computing device, a radio, etc.

Signals may be communicated at varying frequencies. Signals pass through the hub in order to be re-communicated internally or externally. The hub may include a diplexer, a power amplifier, a receiver, a frequency converter, a modem, a transmitter, a security controller, or a network processor. The hub may further include other elements suitable for use with the present invention. For example, the hub may include a filter tuner or a BOB, more examples. The diplexer may allow full duplex transmission or half duplex transmission of data. Half duplex transmission of data may be accomplished by a transmit/receive switch.

A modem at the hub may be connected to an external cable, DSL, a phone line, an Ethernet connection to the Internet, or an Ethernet connection to a local area network. This allows for communication with external sources. Further, external sources may communicate with the hub via wireless transmission.

The first signal may be transmitted from a remote device through the exciter to the hub. In this scenario, the second signal may be sent by the hub via the exciter to another remote device in the structure.

In an alternate embodiment, a hub may be connected to another hub in the structure. Further, more than one exciter may be present in the structure. The exciters may share a hub or have separate hubs, the separate hubs able to communicate with one another through a direct connection. In addition, the hubs may not be directly connected to one another.

In addition to the above mentioned examples, various other modifications and alterations of the system and method may be made without departing from the invention. Accordingly, the above disclosure is not to be considered as limiting and the appended claims are to be interpreted as encompassing the entire spirit and scope of the invention.

INDUSTRIAL APPLICABILTY

In operation, an external signal is communicated to a structure adapted to allow for wireless communication therein. The external signal reaches a hub located in the structure. The hub processes the signal and sends it to an exciter. The exciter sends the signal out, at a frequency provided by the hub, via evanescent waves created by the exciter.

The signal travels along the evanescent waves to probes detachably connected to remote devices, the probes being adapted to receive the signal. The probes relay the received signal to applications electronics (i.e. remote devices). The applications electronics process the information and may create an output signal. The probe electromagnetically couples this output signal to the conductive elements of the structure that passes the output signal back to the exciter. The exciter passes the output signal to the hub. The hub may pass the output signal to another remote device located in the structure and/or the output signal may be passed outside of the structure to external devices. Accordingly, the hub allows for the exchange of information within the wireless communications structure (i.e. internally) as well as the exchange of information from within the wireless communications structure to external devices and vice versa.

For the above, and other, reasons, it is expected that the hub and probe system of the present invention will have widespread industrial applicability. Therefore, it is expected that the commercial utility of the present invention will be extensive and long lasting.

What is claimed is:

1. A hub and probe system in a wireless communications structure, comprising:
    (a) a hub for communicating at least one first signal, wherein the signal is communicated via evanescent waves created by an exciter;
    (b) a probe for receiving the signal;
    (c) conductive elements included in walls of the wireless communications structure for receiving at least one second signal from the probe, the conductive elements communicating the second signal to the exciter; and
    (d) wherein the second signal is passed back to the hub via the exciter.

2. The system as recited in claim 1, wherein at least one of the first signal and the second signal is communicated to the hub from at least one of an external source and an internal source.

3. The system as recited in claim 2, wherein at least one of the first signal and the second signal includes information from at least one of a satellite television, a cable television, an Internet provider, a computing device, a phone provider, a DVD player, a television, and a telephone.

4. The system as recited in claim 2, wherein the external source includes information communicated from outside the structure.

5. The system as recited in claim 2, wherein the internal source includes information communicated from inside the structure.

6. The system as recited in claim 1, wherein the hub includes at least one of a diplexer, a power amplifier, a transmitter, a receiver, a frequency converter, a modem, a security controller, and a network processor.

7. The system as recited in claim 6, wherein the diplexer allows at least one of full duplex transmission and half duplex transmission of data.

8. The system as recited in claim 7, wherein half duplex transmission is accomplished by a transmit/receive switch.

9. The system as recited in claim 1, wherein the probe is connected to a remote device that utilizes information included in at least one of the first signal and the second signal.

10. The system as recited in claim 1, wherein at least one of the first signal and the second signal are at a radio frequency between 0.5–100 MHz.

11. The system as recited in claim 1, wherein the first signal and the second signal are at different radio frequencies.

12. A method for utilizing a hub and probe system in a wireless communications structure, comprising the steps of:
    (a) communicating at least one first signal, wherein the signal is communicated via evanescent waves created by an exciter;
    (b) allowing a probe to receive the signal; and
    (c) receiving at least one second signal from the probe via the exciter, the exciter receiving the second signal from the probe via conductive elements in walls of the structure.

13. The method as recited in claim 12, wherein the at least one of the first signal and the second signal is communicated from at least one of an external source and an internal source.

14. The method as recited in claim 13, wherein at least on of the first signal and the second signal includes information from at least one of a satellite television, a cable television, an Internet provider, a computing device, a phone provider, a DVD player, a television, and a telephone.

15. The method as recited in claim 13, wherein the external source includes information communicated from outside the structure.

16. The method as recited in claim 13, wherein internal source includes information communicated from inside the structure.

17. The method as recited in claim 12, wherein at least one of a diplexer, a power amplifier, a receiver, a frequency converter, a modem, a transmitter, a security controller, and a network processor are included for communicating the first signal.

18. The method as recited in claim 17, wherein the diplexer allows at least one of full duplex transmission and half duplex transmission of data.

19. The method as recited in claim 18, wherein half duplex transmission is accomplished by a transmitter switch.

20. The method as recited in claim 12, wherein the probe is connected to a remote device that utilizes information included in at least on of the first signal and the second signal.

21. The method as recited in claim 12, wherein at least one of the first signal and the second signal are at a radio frequency between 0.5–100 MHz.

22. The method as recited in claim 12, wherein the first signal and the second signal are at different radio frequencies.

* * * * *